United States Patent [19]

Inaba et al.

[11] Patent Number: 4,639,182

[45] Date of Patent: Jan. 27, 1987

[54] CRANE DEVICE INSTALLED IN CARGO TRANSPORTING VEHICLE

[75] Inventors: Mitsuharu Inaba, Utsunomiya; Takashi Sekiguchi, Tochigi; Yoshio Yoneyama; Tadashi Suzuki, both of Utsunomiya, all of Japan

[73] Assignee: Fuji Jukogyo Kabushiki Kaisha, Tokyo, Japan

[21] Appl. No.: 637,650

[22] Filed: Aug. 3, 1984

[30] Foreign Application Priority Data

Aug. 26, 1983 [JP] Japan .............................. 58-132113[U]
Aug. 26, 1983 [JP] Japan .............................. 58-132114[U]
Aug. 26, 1983 [JP] Japan .............................. 58-132115[U]

[51] Int. Cl.$^4$ .............................................. B60P 1/54
[52] U.S. Cl. .................................... 414/543; 212/231; 254/276
[58] Field of Search ................ 414/542, 543; 212/149, 212/151, 153, 159, 231, 247, 248, 267; 254/269, 276; 901/49

[56] References Cited

U.S. PATENT DOCUMENTS

| | | | |
|---|---|---|---|
| 904,457 | 11/1908 | Schuman | 414/543 |
| 1,614,769 | 1/1927 | Amsler | 414/542 |
| 2,772,794 | 12/1956 | Cramer et al. | 414/543 |
| 3,203,671 | 8/1965 | Anderson | 254/276 |
| 3,301,416 | 1/1967 | Bopp | 414/543 |
| 3,477,746 | 11/1969 | Watson | 212/247 X |
| 3,935,950 | 2/1976 | Burch | 901/49 X |
| 4,005,852 | 2/1977 | Schmitmeyer et al. | 212/153 X |
| 4,236,864 | 12/1980 | Couture et al. | 212/151 X |
| 4,249,853 | 2/1981 | Lyvers | 414/543 |
| 4,332,989 | 6/1982 | Nicolaisen | 901/49 X |

FOREIGN PATENT DOCUMENTS 1900820 8/1962 Fed. Rep. of Germany ...... 212/268

Primary Examiner—Robert J. Spar
Assistant Examiner—David A. Bucci
Attorney, Agent, or Firm—Martin A. Farber

[57] ABSTRACT

A crane device is installed in a freight car with a roof and comprises a revolvable frame suspended by the roof so as to be revolvable about a vertical axis, a derrick boom assembly having a telescopically extendable boom and luffably supported by the revolvable frame, a winch mounted on the revolvable frame and operating to lower and raise a cargo hook via a length of wire rope, a control system using motive power to operate the crane device, and a safety system having a tactile sensor on the front end of the boom and operating to stop movements of the boom when the sensor contacts an object such as a part of a freight car or a piece of cargo. The winch is provided with a safety device for preventing excessive unwinding of the wire rope.

3 Claims, 15 Drawing Figures

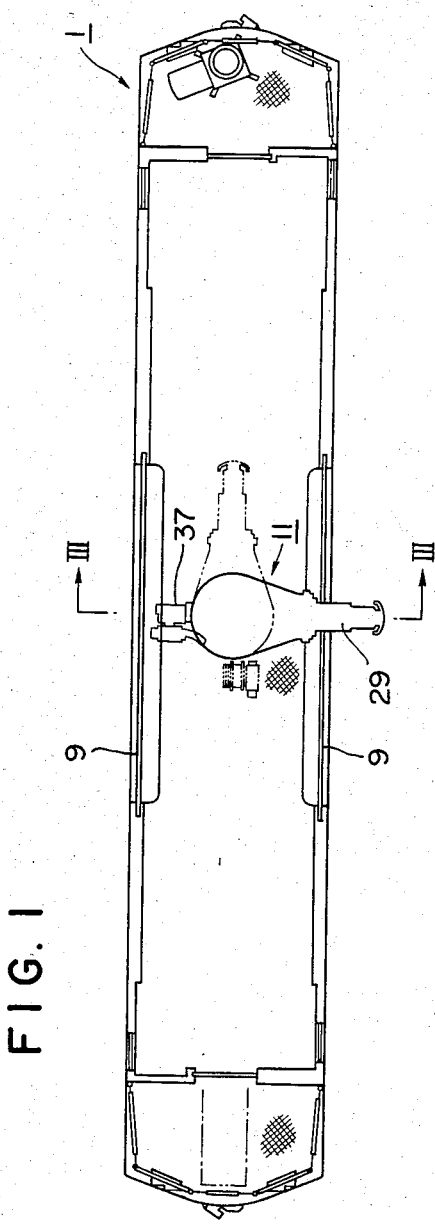
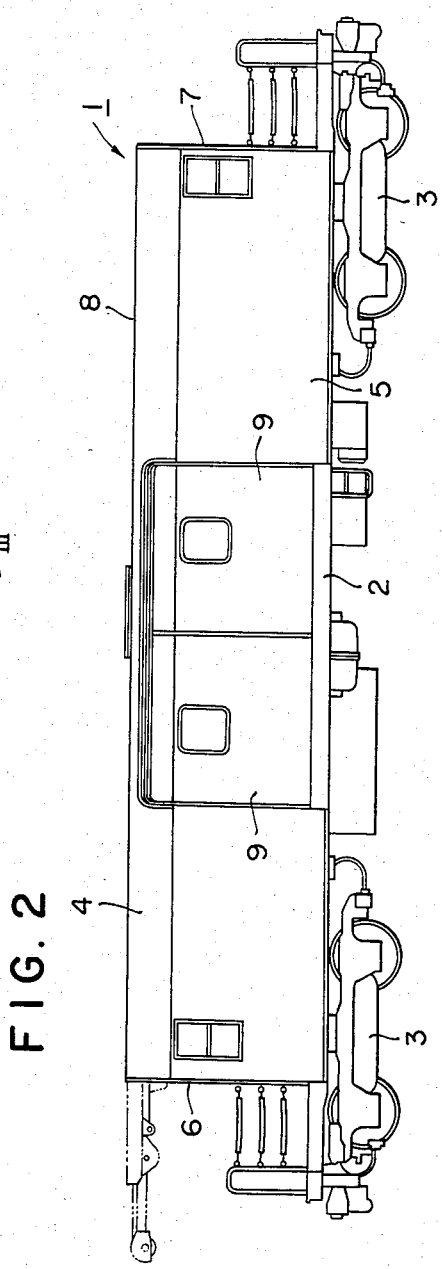
FIG. 1
FIG. 2

CRANE DEVICE INSTALLED IN CARGO TRANSPORTING VEHICLE

BACKGROUND OF THE INVENTION

This invention relates generally to cargo transporting vehicles (hereinafter referred to as cargo vehicle(s)) and to crane devices and more particularly to a crane device installed in a cargo vehicle with a roof structure such as a boxcar.

In general, for loading cargo onto the cargo deck or cargo room aboard a cargo vehicle such as a freight car of a boxcar type, for example, or for unloading cargo previously loaded into the cargo room, a cargo handling machine such as a forklift is used. The fork of a forklift, however, can reach only slightly into the doorway of a freight car such as a boxcar, whereby handling and moving of cargo between a doorway and places in the freight car which cannot be reached by the fork, must be carried out by manual labor. This requires a long work time and many workers, resulting in inefficiency.

Another problem encountered in the use of a forklift is that it can be used in only places where it can enter and operate with a certain degree of freedom, whereby the cargo loading and unloading areas are also limited.

One measure leading to a solution of these problems is the installation of a cargo handling device or machine in the cargo vehicle. In the installation of such a cargo handling device in a cargo vehicle, particularly a boxcar, certain further problems are encountered.

Since the space in the cargo room of a cargo vehicle with a roof structure is small, the moving parts of the cargo handling device, which according to this invention is a crane device, are liable to contact or strike against the ceiling or walls of the boxcar cargo room. Consequently the operation of the crane device requires skill on the part of the operator. Errors in the operation giving rise to collision between the moving parts of the crane device and the body parts of the boxcar will cause damage to such moving parts and/or the body parts.

The crane device in almost all cases has a winch with a drum for winding and unwinding a length of wire rope to raise and lower a cargo hook which is connected directly or via a block to the wire rope, and from which articles of cargo are suspended. The wire rope is ordinarily provided with ample total length so that a number of winding turns will be left on the drum when the cargo hook has been lowered to its lowest position for normal operation. The inner end of the wire rope is ordinarily anchored to the drum, whereby, if the entire length of the wire rope is unwound under abnormal circumstances, and the drum is continuously rotated in the same direction, the drum will then wind up the wire rope. If the inner end of wire rope should become disconnected from the drum when its entire length has been thus unwound, an extremely dangerous condition will arise.

In order to avoid such a hazardous condition, it is the ordinary practice to stop the unwinding operation of the winch when 3 to 4 or more winding turns of the wire rope are still remaining on the drum. Heretofore, this procedure has been practiced by the winch operator on the basis of his visual perception, experience, and intuition. This practice, however, lacks accuracy and positiveness.

SUMMARY OF THE INVENTION

It is an object of this invention to provide in a cargo vehicle a crane device capable of easily moving cargo between the exterior and interior of the cargo room of the cargo vehicle and, at the same time, of moving the cargo to any position within the cargo room.

Another object of the invention is to provide a crane device as stated above which is provided with a safety system which operates, when the outer end of the boom of the crane device contacts another object such as a wall or the ceiling of the cargo vehicle or an item of cargo, to detect this contacting and stop further movement of the boom.

Still another object of the invention is to provide, in a crane device as stated above, a winch device with means for automatically stopping the winch motor when the wire rope has been unwound to an extent at which three to five winding turns thereof are left in wound state on the winch winding drum so as to prevent excessive paying off of the wire rope.

According to this invention in a principal aspect thereof, briefly summarized, there is provided, in an installed state in a cargo vehicle with a roof structure, a crane device comprising: a revolvable frame supported in the center of the roof structure in a suspended manner permitting the revolvable frame to revolve about a vertical axis; a derrick boom assembly luffably supported by the revolvable frame and having a boom adapted to be extensible forward and contractable in its longitudinal direction; first driving means including motive power means for driving the revolvable frame in revolving movement; second driving means including motive power means for driving the boom assembly in luffing movement; third driving means including motive power means for driving the boom in extending and contracting movement; a winch device mounted on the revolvable frame and having a winding drum, a length of the wire rope, a portion of which is secured to and wound around the winding drum, the remaining outer portion of which is led to the extreme forward end of the boom, and a cargo hook adapted to be lowered and raised from said forward end by the wire rope unwound from and wound up on the winding drum; fourth driving means for driving the winch device in the operation thereof; motive power means for each of the first through fourth driving means; and a safety system having a tactile sensor mounted on the extreme front end of the boom and operating to stop movements of the boom when the tactile sensor contacts or strikes against an object.

The nature, utility, and further features of this invention will be more clearly apparent from the following detailed description with respect to preferred embodiments of the invention when read in conjunction with the accompanying drawings, briefly described below.

BRIEF DESCRIPTION OF THE DRAWINGS

In the accompanying drawings:

FIGS. 1 and 2 are respectively a plan view, in horizontal section, and a side elevation of the freight car of boxcar type in which a crane device of this invention is installed;

DETAILED DESCRIPTION OF THE PREFERRED EMBODIMENTS

Figure 3:
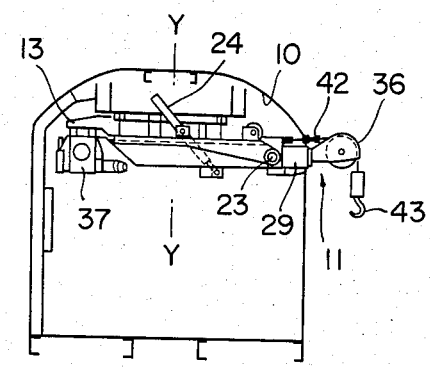
FIG. 3 is a cross section taken along the plane indicated by line III—III in FIG. 1 as viewed in the arrow direction.

Referring first to FIGS. 1, 2, and 3, the example of the freight car 1, in which the crane device according to this invention is installed, has an underframe 2 pivotally supported on trucks (or bogies) 3, 3 and in turn supporting a car body 4. The car body 4 has left and right side walls 5, a front wall 6, a rear wall 7, and a roof 8. In the middle part of each side wall 5, side doors 9, 9 of the sliding type are provided. A crane device 11 of a construction according to this invention is supported in a suspended manner from the ceiling structure 10 under the roof 8.

This crane device 11 has a support frame 12 fixedly suspended from the ceiling structure 10 and a revolvable frame 13 supported in a manner permitting it to be revolvable about a vertical axis Y—Y relative to the support frame 12 and centrally with respect to the ceiling structure. The support frame 12 has a horizontal support plate 15 fixed to the lower ends of a plurality of struts 14 rigidly suspended from the ceiling structure 10. An internal gear teeth holding ring 16 is secured to the lower surface of the support plate 15 by means such as bolts. This internal gear teeth holding ring 16 has internal gear teeth 17 formed around its entire internal rim.

The revolvable frame 13 is revolvably suspended from and with respect to the internal gear teeth holding ring 16 by way of support bearings 18. On the inner side of this revolvable frame 13, a driving pinion 19 in mesh with the internal gear teeth 17 of the ring 16 is rotatably supported and is coupled to a hydraulic motor 20 for driving the revolvable frame 13. Thus, when the hydraulic motor 20 is activated to drive the pinion 19 in rotation with respect to the internal teeth 17, the revolvable frame 13 is caused to revolve about the vertical axis Y—Y.

One part of the revolvable frame extends in the direction toward the working end of the crane device 11, which direction will herein be referred to as the forward or front direction, and has a forked or clevis bracket 21 formed at its forward end. One part of a boom outer tube 22 of a boom 29 is disposed within the space 21a between the fork arms of this bracket 21 and is pivotally supported on the bracket 21 by a horizontal pivot shaft 23. Accordingly, the boom outer tube 22 can undergo derricking or luffing motion about the pivot shaft 23. The boom outer tube 22 is actuated to thus undergo luffing motion by a pair of luffing cylinder devices 24, 24.

Figure 4:
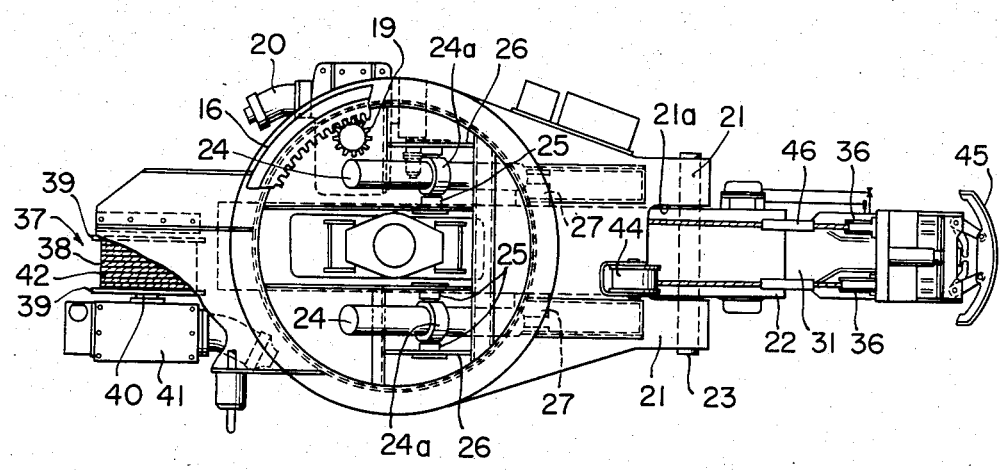
FIG. 4 is a plan view, with some parts cut away, showing the essential mechanical moving parts of one example of the crane device of the invention.
Figure 5:
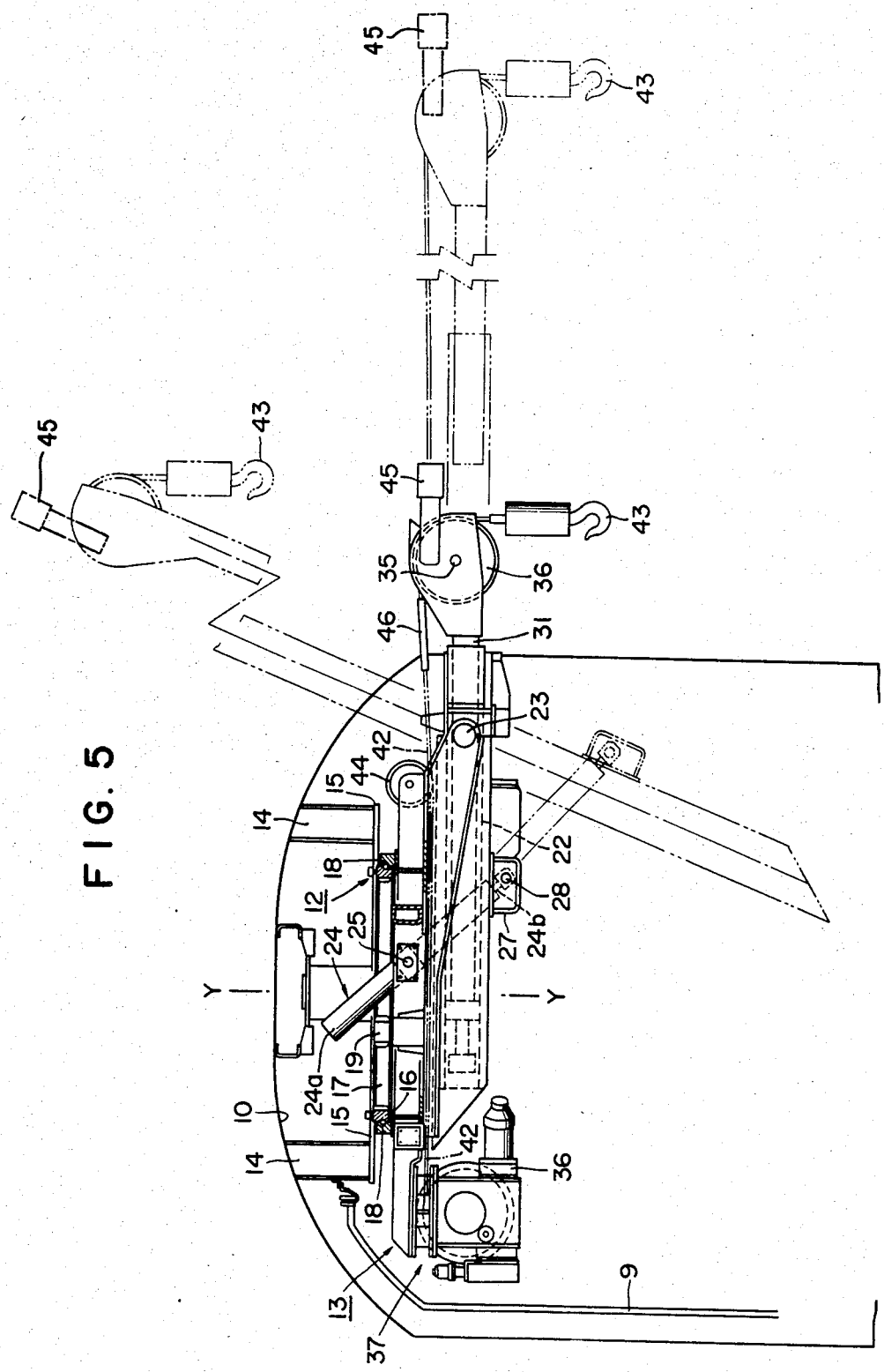
FIG. 5 is a side elevation of the crane device installed in the freight car.

As shown in FIGS. 4 and 5, these luffing cylinder devices 24, 24 are respectively disposed on opposite sides of the boom outer tube 22, and the cylinder 24a of each luffing cylinder device 24 has trunnions 25, 25 projecting outwardly from opposite sides thereof and pivotally supported on reinforcing cross beams 26, 26 of the revolvable frame 13. Each cylinder 24a has a piston and piston rod 24b, the actuating end of which is pin-connected by a pin 28 to a boom reinforcing member 27 fixed to and projecting outwardly from the boom outer tube 22.

Figure 6:
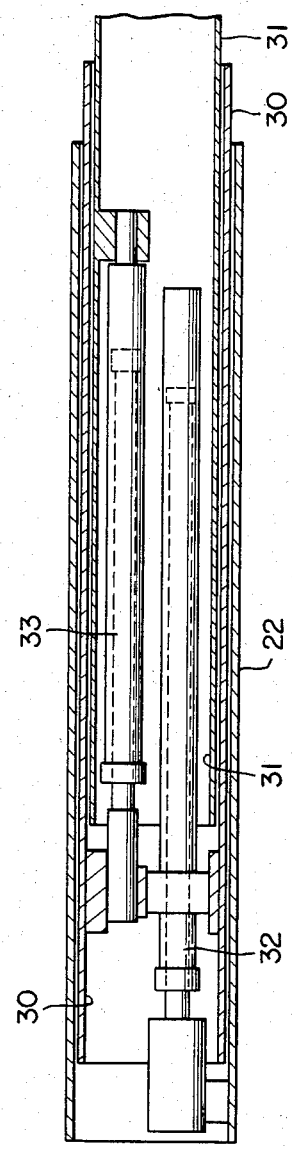
FIG. 6 is side view, with parts shown in longitudinal section and one part cut off, of the telescopic boom of the crane device.
Figure 7:
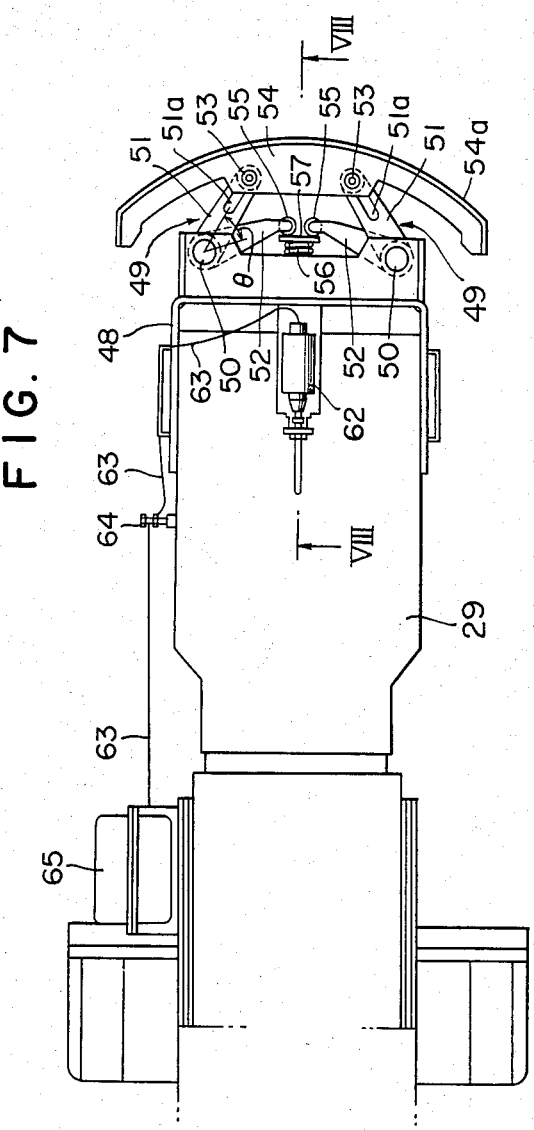
FIG. 7 is a relatively enlarged plan view showing a tactile sensor and related parts provided at the extreme front end of the boom.
Figure 8:
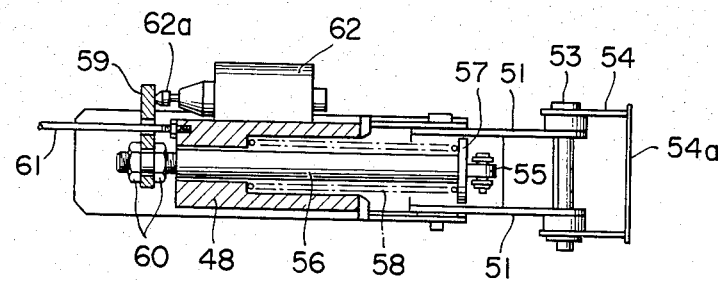
FIG. 8 is a section taken along the plane indicated by line VIII—VIII in FIG. 7 as viewed in the arrow direction.
Figure 9:
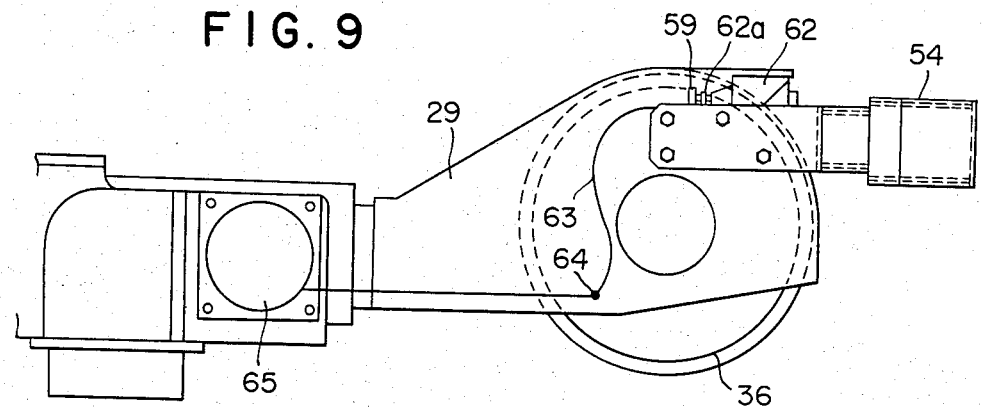
FIG. 9 is a right side elevation, orthogonal to FIG. 7, of the front end of the boom.

Within the boom outer tube 22, at least one boom inner tube is slidably fitted to constitute a hydraulic cylinder device of telescopic type. In one example illustrated in FIG. 6, two boom inner tubes are used. More specifically, in the interior of the boom outer tube 22, a first boom inner tube 30 is slidably fitted in the outer tube 22, and a second boom inner tube 31 is slidably fitted in the first inner tube 30 thereby to form a telescopic extendable and contractable boom structure. The first inner tube 30 is extendable forward and retractable rearward by a first extension/retraction cylinder device 32 coupled at one end thereto and anchored at the other end to the inner wall surface of the outer tube 22. The second inner tube 31 is extendable forward and retractable rearward by a second extension/retraction cylinder device 33 coupled at one end thereto and anchored at the other end to the inner wall surface of the first inner tube 30. The construction and the mode of actuation per se of these telescopic cylinder devices are known in the art.

On the forward end of the second boom inner tube 31 sheaves or pulleys 36, 36 are rotatably supported by a horizontal support shaft 35. While a single pulley 36 may be used, two pulleys are used in the instant example.

At the rear end of the revolvable frame 13, a winch 37 is secured thereto in a suspended state. This winch 37 has a winding drum 38 with flanges 39, 39 integrally provided at its opposite ends. The winding drum 38 is fixedly supported on a drum shaft 40, which is coupled to and can be driven in rotation by a hydraulic motor 41. Several winding turns of two lengths of wire rope 42 are wound around the winding drum 38. As shown in FIG. 5, the lengths of wire rope 42 are led from the winding drum 38 forward along the upper surface of the boom outer tube 22, are respectively turned around the peripheral grooves of the pulley 36, 36, and are free to hang down. A cargo hook 43 is secured to the extreme outer ends of the lengths of wire rope 42. Guide rollers 44, 44 are rotatably supported on the revolvable frame 13 at respective positions slightly above and to the rear of the pivot shaft 23 and respectively above the two lengths of the wire rope 42 at intermediate parts in their spans. The guide rollers 44, 44 function to provide lowfriction guides around which the lengths of wire rope 42 can be bent in direction when the boom is luffed above its horizontal position.

A tactile sensor 45 is mounted on the extreme front end of the second boom inner tube 31 as shown in FIGS. 4 and 5 and constitutes an essential component of a safety system which functions to stop the movements of the boom when the extreme forward end of the boom contacts parts of a freight car interior such as the ceiling or a side wall. Further, load restricting devices 46 are provided on the lengths of wire rope 42 at positions near the front ends thereof.

Handling cargo into and out of the freight car with the crane device of the above-described construction and organization according to this invention is carried out in the following manner.

First, in order to load cargo placed outside the freight car 1 into the cargo room, the nearest side doors 9, 9 are fully opened, and the first and second extension/contraction cylinder devices 32 and 33 are activated to extend the boom inner tube 31 to the necessary length and then stopped. Then, if necessary, the luffing cylinder devices 24 are operated to cause the boom outer tube 22 to luff about the pivot shaft 23 to set the boom 22, 30, and 31 at the required angle of elevation.

Next, the hydraulic motor 41 is operated to rotate the winding drum 38 of the winch 37 in the unwinding direction thereby to let out the lengths of wire rope 42 and lower the cargo hook 43, which is then hooked onto the cargo. The hydraulic motor 41 is then operated in the winding direction to take up the lengths of wire rope 42 and is stopped when the bottom surface of the cargo rises to a height above the floor level of the cargo room in the freight car 1. Thereafter, by activating the first and second extension/contraction cylinder devices 32 and 33, the boom inner tube 31 is retracted thereby to bring the cargo near the open doorway.

The hydraulic motor 20 is then operated to rotate the driving pinion 19 causing the revolvable frame 13 to revolve about the vertical axis Y—Y in the desired direction and move the cargo to a specific position within the cargo room. When, at this time, the position where the cargo is to be placed is near the forward or rear end of the freight car, the extension/contraction cylinder devices 32 and 33 are further activated to extend the boom inner tube 31. When the cargo has been thus brought to a desired position, the hydraulic motor 41 of the winch 37 is operated in the rotational direction for lowering the load thereby to pay out the lengths of wire rope 42 and lower the cargo onto the floor of the freight car.

In the above-described loading operation, the cargo can be moved to any position within the cargo room by combining the extension/contraction movement of the boom inner tube 31 and the revolving movement of the revolvable frame 13. When a certain piece of cargo within the cargo room is to be unloaded out of the freight car, the above-described loading operational steps are carried out in reverse sequence.

The aforementioned safety system according to this invention, including the tactile sensor device 45 mounted on the forward end of the boom 29 and related parts, will now be described in detail with reference to FIGS. 7 through 10.

A bracket 48 is fixed to the forward end of the boom 29. A pair of bell cranks 49, 49 are pivotally supported by respective crank shafts 50, 50 at transversely and symmetrically spaced-apart positions on the bracket 48.

Each bell crank 49 has an outer arm 51 and an inner arm 52 with an angle $\theta$ therebetween, which is set at a value less than 90 degrees. At its free end part, each outer arm 51 has a slot 51a formed therethrough. A tactile feeler 54 is connected to the outer arms 51 of the two bell cranks by pins 53, 53 inserted through and engaged with respective slots 51a of the outer arms 51. The tactile feeler 54 has an outer surface 54a facing forward of arcuate shape as viewed in plan view. This tactile feeler 54, the two outer crank arms 51, 51, and the bracket 48 constitute a form of four-bar linkage with two adjacent connections of pin-and-slot type. When a part of the outer surface 54a of the tactile feeler 54 contacts an object, the tactile feeler 54 is displaced rearwardly.

At the free end of the inner arm 52 of each bell crank 49, a roller 55 is rotatably supported and is in rollable contact with the outer surface of a flange 57, which is coaxially fixed to the forward end of a detector rod 56. This detector rod 56 is parallel to the longitudinal direction of the boom 29 and is slidably fitted in a guide part of the bracket 48. A coil spring 58 is disposed around the detector rod 56 in compressed state between the rear face of the flange 57 and a part of the bracket 48, whereby the detector rod 56 is urged forward relative to the bracket 48 by the spring force of this spring 58.

The rear end of the detector rod 56, which is free of the bracket 48, is threaded and supports a sensor plate 59 secured thereto by nuts 60 in screw engagement with the rear end of the detector rod. A guide bar 61 fixed to the bracket 48 and extending parallel to the detector rod 56 is inserted slidably through a corresponding hole in the sensor plate 59 and thereby functions to permit only translational movement and prevent rotational movement of the sensor plate 59.

A detection switch 62 is mounted on the bracket 48. In this example, this detection switch 62 is a normally-closed type microswitch with a movable contact 62a in abutting contact with the forward face of the sensor plate 59. The detection switch 62 is connected to an electrical circuit as described below through a lead wire 63 which is anchored at a pin 64 projecting laterally from the side face of the boom 29 and is taken up on a reel 65.

Figure 10:
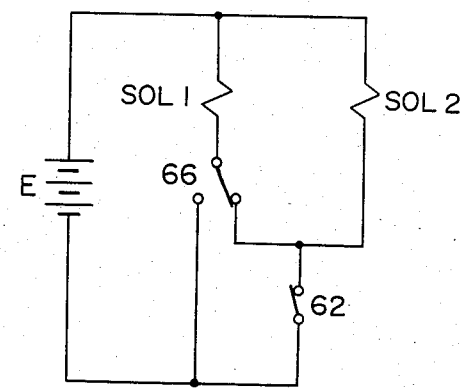
FIG. 10 is a circuit diagram of the circuit including a detection switch for controlling the extension/contraction and revolution movements of the boom.

The detection switch 62 is installed in an electrical circuit for activating solenoids for controlling a hydraulic circuit (not shown) for actuating the boom 29 in its extension/contraction movement and revolving movement. More specifically, as indicated in FIG. 10, solenoids $SOL_1$ and $SOL_2$ are connected in parallel relative to a power supply E. The solenoid $SOL_1$ is operable to actuate a hydraulic changeover valve for imparting extension/contraction movement to the boom 29 in the hydraulic circuit, while the solenoid $SOL_2$ is operable to actuate a hydraulic changeover valve for imparting revolving movement to the revolvable frame 13 and the boom 29. The normally-closed detection switch 62 is connected between the parallel-connected combination of the solenoids $SOL_1$ and $SOL_2$ and the power supply E. Furthermore, a changeover switch 66 switching between the extension and contraction movements of the boom 29 is connected between the negative side of the solenoid $SOL_1$ and the power supply E.

The crane device 11, particularly the boom 29 and related parts, of the above-described construction and organization according to this invention operates in the following manner.

When the crane device 11 is in a state wherein the forward end of its boom 29 is within the cargo room and is not contacting an object such as the ceiling, inner wall surface, or a piece of cargo, the detector rod 56 is in its forwardly advanced position (to the right as viewed in FIG. 8), being urged forward by the spring force of the spring 58. Accordingly, the sensor plate 59 presses the movable contact 62a of the detection switch 62 inwardly thereby closing the contact. Therefore, with the detection system in this state, the solenoids SOL$_1$ and SOL$_2$ are in their operable states in the circuit shown in FIG. 10 and can cause the extension/contraction movement and revolving movement of the boom 29 by activating the hydraulic circuit (not shown).

If, during the operations of extending and revolving of the boom 29 of the crane, the extreme forward end of the boom 29 contacts a wall of the cargo room, a cargo item, or some other object, the tactile feeler 54 will be pushed rearwardly relative to the boom 29. Consequently, this rearward movement of the tactile feeler is transmitted via the bell cranks 49, 49 to force the detector rod 56 rearwardly, overcoming the spring force of the spring 58. As a result, the sensor plate 59 is displaced rearwardly, and the contact points of the detection switch 62 are opened. As a consequence, the current flowing until then through the solenoid SOL$_1$ and/or the solenoid SOL$_2$ in the circuit shown in FIG. 10 is cut off, whereby the extending movement and revolving movement of the boom 29 are stopped. Thus, damaging of the boom and other objects due to the application of undue forces thereto can be prevented.

The winch device 37 constituting an important component of the crane device 11 in the freight car of this invention will now be described in detail with respect to one example 37a thereof in conjunction with FIGS. 11 through 15. This winch device 37a, for the sake of convenience and clarity in description, is a simplified form of the winch 37 shown in FIGS. 3, 4, and 5, functioning to wind up and pay out only a single length of wire rope 42, but in other respects and in principle is the same as the winch 37.

As described hereinbefore, a boom inner tube 31a is slidably fitted in a boom outer tube 22a and is actuated in extending and retracting movement relative to the boom outer tube 22a by a hydraulic cylinder device 33a of known telescopic type. At its outer or forward end, the boom inner tube 31a rotatably supports a sheave or pulley 36. A winch device of the overall designation 37a is installed to the rear of the boom outer tube 22a.

This winch device 37a has a winding drum 38 provided with flanges 39, 39 at its opposite ends and fixed to a horizontal drum shaft 40 extending transversely outwardly from the flanges 39, 39. The outer ends of the drum shaft 40 are rotatably supported by bearings 40a, 40a on a winch bracket 70. One end of the drum shaft 40 is directly coupled to a hydraulic motor 41, by which the winding drum 38 can be driven in rotation. A length of wire rope 42 is wound several turns around the winding drum 38. The free outer end of this wire rope 42 is led out along the upper surface of the boom outer tube 22a, is turned around a portion of the peripheral groove of the pulley 36 to hang downwardly, and is secured at it extreme end to a cargo hook 43.

Figure 13:
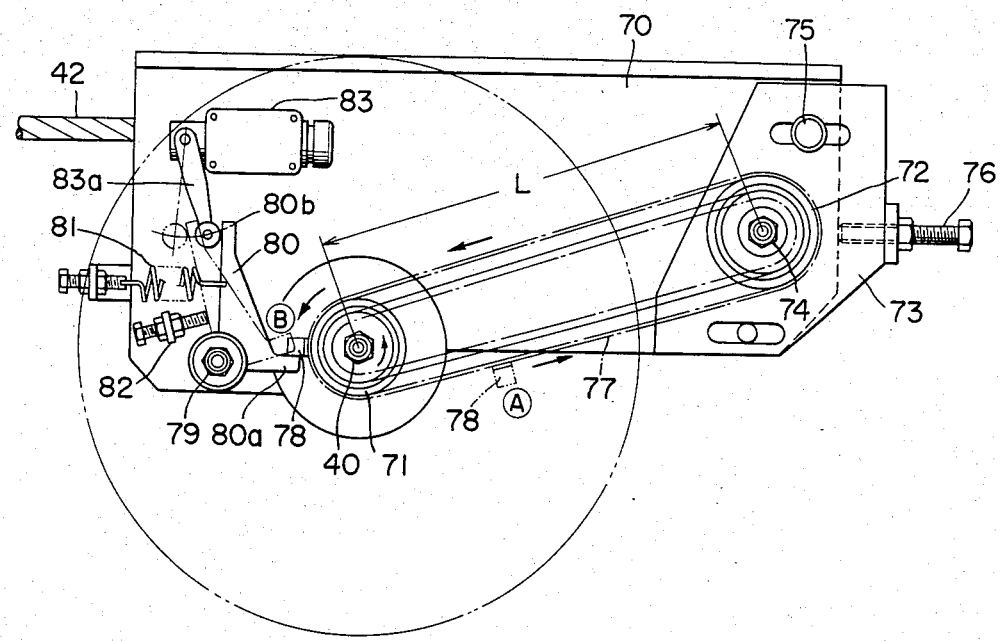
FIGS. 13 and 14 are respectively a side view and a corresponding plan view, with parts in horizontal section and parts foreshortened, showing an example of a safety device for preventing excessive unwinding of the wire rope from the winding drum of the winch device shown in FIGS. 11 and 12.
Figure 14:
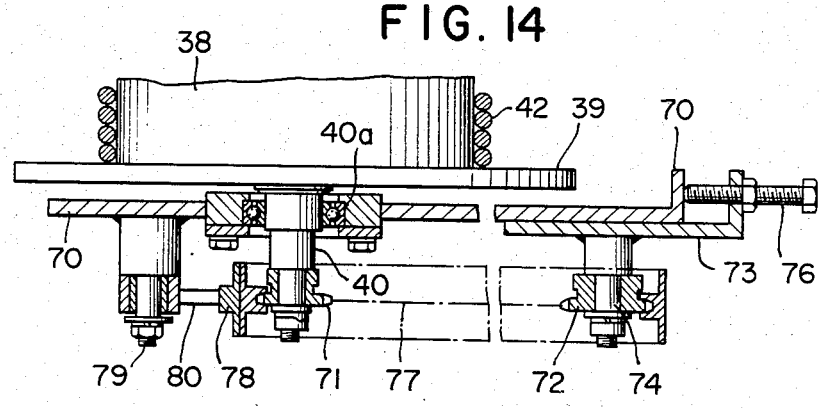

As best seen in FIGS. 13 and 14, a first sprocket 71 is fixed to one end of the drum shaft 40, preferably the end opposite the end coupled to the hydraulic motor 41. A second sprocket 72 is rotatably supported on a horizontal sprocket shaft 74 fixed at its root part to a slide plate 73 and extending laterally therefrom. The slide plate 73 is slidably supported relative to the winch bracket 70 and can be secured in position relative to the winch bracket 70 by a bolt 75 passing through and engaged with the parallel sides of a slot formed in the slide plate 73. The first and second sprockets 71 and 72 are disposed to lie in the same plane, in which their centers are spaced apart by a nominal distance L. This distance between the sprocket centers can be adjusted by turning an adjusting bolt 76 rotatably mounted on the slide plate 73 and abutting against the winch bracket 70.

An endless chain 77 is passed around the first and second sprockets 71 and 72. The total length of this chain 77 is so selected as to correspond to the total allowable pay-off length of the wire rope 42. A detection actuator (also called detection plate) 78 is fixed to the outer face of the chain 77 at a specific position thereon to project outwardly therefrom and travels together with the chain 77.

Forward of the first sprocket 71, a changeover bell crank 80 is pivotally supported on a transverse pivot shaft 79 fixed at its root end to the winch bracket 70. One arm of this bell crank 80 ends in a contact tooth 80a lying in the path of the above-described detection plate 78 to be contactable thereby. The other arm of the bell crank 80 ends in a contactor 80b. A tension spring 81 is connected in stretched state between the bell crank 80 and a part of the winch bracket 70 and imparts a force to the bell crank 80 urging it to rotate in the counterclockwise direction around the pivot shaft 79. The limit of this rotation of the bell crank 80 is set by an adjustable stop screw 82 disposed to be contacted by the arm of the bell crank 80 with the contactor 80b at its end.

Figure 15:
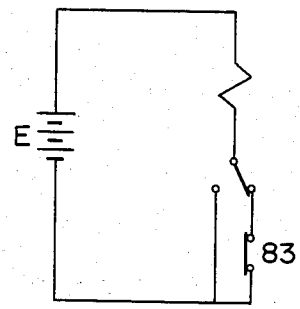
FIG. 15 is a circuit diagram of a circuit, including a detection switch, for controllably supplying power to the motor for driving the winch device.

A detection switch 83 is mounted on the winch bracket 70 at a position such that its actuation arm 83a is in contact with the contactor 80b of the bell crank 80 to be actuated thereby. For this detection switch 83, a microswitch is preferable and is installed with a normally-closed contact in the electrical circuit for driving the winch motor 41 as indicated in FIG. 15.

The winch device 37a of the above described construction according to this invention is operated in the following manner.

Figure 11:
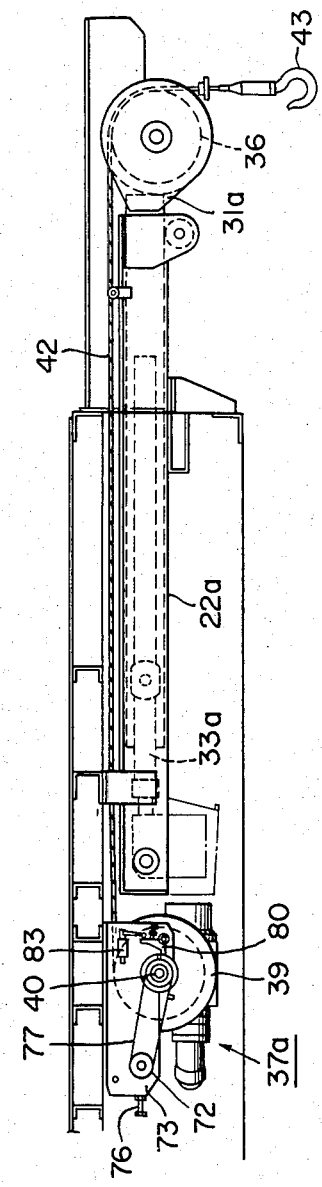
FIGS. 11 and 12 are respectively a side elevation and a corresponding plan view of an example of a winch device in the crane device of the invention.
Figure 12:
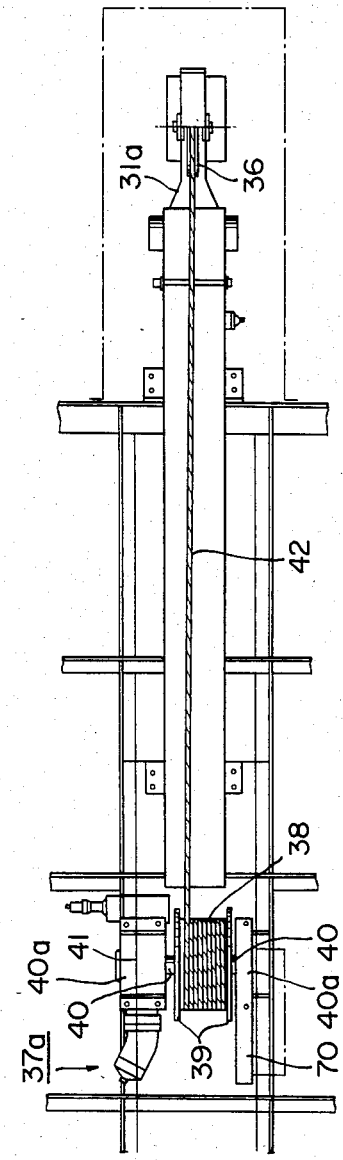

When the cargo hook 43 of the crane device is at its uppermost position as indicated by solid line in FIG. 11, the boom inner tube 31a is in its most retracted position. At this time, the wire rope 42 is wound to its fullest extent around the winding drum 38 of the winch, and the detection plate 78 is in the position Ⓐ in FIG. 13. When the instant device is in this state, the changeover bell crank 80 is in its position indicated by phantom chain line in FIG. 13, whereby the movable contact (not shown) of the detection switch 83 is in its closed position.

When, with the device in this state, the hydraulic motor 11 is driven in the direction to lower the cargo hook 43, the wire rope 42 is paid off from the winch drum 38. Interrelatedly with this action, the first sprocket 71 rotates in the counterclockwise direction as viewed in FIG. 13 and drives the chain 77 in the arrow direction. Accordingly, the detection plate 78 on the chain 77 travels in the arrow direction together with the chain 77 through a travel distance which is proportional to the length of pay off of the wire rope 42 from the winch drum 38.

The detection plate 78 thus travels from the position Ⓐ and, moving around a portion of the outer side of the second sprocket 72, ultimately reaches the position Ⓑ. Immediately before it reaches this position Ⓑ, the detection plate 78 contacts and engages with the contactor tooth 80a of the changeover bell crank 80 and forces the bell crank 80 to rotate clockwise about the pivot shaft 79. When the bell crank 80 thus rotates and reaches the position indicated by solid line in FIG. 13, the movable contact of the detection switch 83 is placed in its opened position. Accordingly, the current flowing through the control circuit of the winch motor 41 is cut off, whereby the motor 41 stops.

By so designing and setting the above described winch device and the related boom and wire rope parts that three to five winding turns of the wire rope 42 remain in wound state on the winding drum 38 when the detection plate 78 thus reaches the position Ⓑ and the motor 41 stops, excessive paying off of the wire rope 42 can be prevented.

While one example of mechanical organization of the winch device of the invention has been described above in detail, it will be obvious that many modifications can be made in the details without departing from the purport and spirit of the invention. For example, but not limited thereto a combination of an endless belt and pulleys can be used in place of the combination of the chain 77 and the first and second sprockets 71 and 72 described above.

As will be apparent from the foregoing description, because of the provision according to this invention in a roofed cargo vehicle of a crane device having as many as four degrees of operational action, it is possible to load and unload cargo into and out of the cargo vehicle without using a loading machine such as a forklift. Furthermore, because of this feature of the crane device of this invention, it can move pieces of cargo to and from all parts of the interior of the cargo vehicle, whereby this work can be carried out efficiently and rapidly without the necessity of using a crew of several laborers.

Moreover, the crane device of this invention can be operated freely without the risk of damaging either the crane device itself or other objects because of the provision of the safety system with the tactile sensor at the front end of the boom. Excessive unwinding of the wire rope by the winch device is also prevented by the safety device as described above.

While this invention has been described above in great detail with respect to a preferred embodiment thereof as applied to a railroad freight car of boxcar type, it is to be understood that the invention is not thus limited. For example, the crane device of this invention is applicable to other cargo vehicles with roof structures such as motor vehicle trucks, trailers, semitrailers, cargo aircraft, and surface seacraft such as small and medium cargo ships and barges. Furthermore, the various details and particulars of the mechanical and electrical organization of the instant crane device can be modified without departing from the invention.

What is claimed is:

1. A crane device installed in a cargo transporting vehicle with a roof structure and comprising:
    a revolvable frame supported by the roof structure in a suspended manner permitting revolution of the revolvable frame about a vertical axis;
    a derrick boom assembly luffably supported by the revolvable frame and having a boom adapted to be extendible forward and contractible rearward in the longitudinal direction thereof;
    a winch means mounted on the revolvable frame and having a winding drum, a length of wire rope, a portion of which is secured to and wound around the winding drum, the remaining outer portion of which is led to the extreme forward end of the boom, and a cargo hook adapted to be lowered and raised from said forward end by the wire rope unwound from and wound up on the winding drum;
    first driving means for driving the revolving frame in revolution;
    second driving means for driving the boom assembly in luffing movement;
    third driving means for driving the boom in extending and contracting movement;
    fourth driving means for driving the winch means in the operation thereof;
    motive power means for each of the first through fourth driving means;
    a safety system having a tactile sensor mounted on the extreme front end of the boom and operating to stop movements of the boom when the tactile sensor contacts an object;
    the tactile sensor comprises:
    a pair of bell cranks pivotally supported on the extreme front end of the boom by respective pivot pins disposed apart and symmetrically on opposite lateral sides of the boom centerline, each bell crank having an inner arm and an outer arm pin connected to a tactile feeler;
    a detector rod slidably supported on the boom to move longitudinally rearward upon being pressed at a front end thereof by said inner arms of the bell cranks when the tactile feeler contacts an object;
    a spring urging the detector rod in the forward direction; and
    a detection switch operable in closing and opening action by the detector rod.

2. A crane device according to claim 1 in which the safety system has an electrical circuit including the detection switch, a power supply, and solenoids for controlling a hydraulic circuit serving as said motive power means for at least said first and third driving means, whereby, when the tactile feeler contacts an object, the electrical circuit is activated to stop at least the first and third driving means.

3. A crane device installed in a cargo transporting vehicle with a roof structure and comprising:
    a revolvable frame supported by the roof structure in a suspended manner permitting revolution of the revolvable frame about a vertical axis;
    a derrick boom assembly luffably supported by the revolvable frame and having a boom adapted to be extendible forward and contractible rearward in the longitudinal direction thereof;
    a winch means mounted on the revolvable frame and having a winding drum, a length of wire rope, a portion of which is secured to and wound around the winding drum, the remaining outer portion of which is led to the extreme forward end of the boom, and a cargo hook adapted to be lowered and raised from said forward end by the wire rope unwound from and wound up on the winding drum;
    first driving means for driving the revolving frame in revolution;
    second driving means for driving the boom assembly in luffing movement;
    third driving means for driving the boom in extending and contracting movement;

fourth driving means for driving the winch means in the operation thereof;

motive power means for each of the first through fourth driving means;

the winding drum of the winch means is fixedly supported on a drum shaft driven by said fourth driving means, and the winch means is provided with a safety device for preventing the entire length of wire rope from being unwound from the winding drum;

said safety device comprising: first wheel means intercoupled to the drum shaft; second wheel means rotatably supported at a position spaced apart by a specific distance from the first wheel means; a flexible, endless power-transmitting member passed around the first and second wheel means and functioning to travel therearound without slippage therebetween; a detection actuator fixed to said power-transmitting member at a preset position thereon to project therefrom and travel unitarily therewith; a detection switch is operable to stop said fourth driving means; and a mechanism having a part disposed in the travel path of the detection actuator and, upon being actuated thereby, operates the detection switch thereby to stop said fourth driving means, said specific distance between the first and second wheel means and said preset position of the detection actuator on the power-transmitting member being so selected that the fourth driving means will be thus stopped when the wire rope has been unwound to an extent such that only three to five winding turns thereof remain on the winding drum.

* * * * *